（12) United States Patent
Duffin et al.

(10) Patent No.: US 11,358,160 B2
(45) Date of Patent: Jun. 14, 2022

(54) SPRINKLER BRAKING MECHANISM

(71) Applicants: Don D. Duffin, Paul, ID (US); Roger M. Duffin, Paul, ID (US)

(72) Inventors: Don D. Duffin, Paul, ID (US); Roger M. Duffin, Paul, ID (US)

(73) Assignee: XCAD VALVE AND IRRIGATION, INC, Paul, ID (US)

(*) Notice: Subject to any disclaimer, the term of this patent is extended or adjusted under 35 U.S.C. 154(b) by 0 days.

(21) Appl. No.: 16/538,716

(22) Filed: Aug. 12, 2019

(65) Prior Publication Data

US 2020/0078805 A1   Mar. 12, 2020

Related U.S. Application Data

(60) Provisional application No. 62/717,321, filed on Aug. 10, 2018.

(51) Int. Cl.
| | |
|---|---|
| *B05B 3/00* | (2006.01) |
| *F16D 65/22* | (2006.01) |
| *F16D 59/00* | (2006.01) |
| *F16D 51/26* | (2006.01) |

(52) U.S. Cl.
CPC .............. *B05B 3/003* (2013.01); *F16D 51/26* (2013.01); *F16D 59/00* (2013.01); *F16D 65/22* (2013.01)

(58) Field of Classification Search
CPC ..... B05B 3/003; B05B 3/005; B05B 3/15–74; F16D 59/00; F16D 65/22; F16D 51/26
See application file for complete search history.

(56) References Cited

U.S. PATENT DOCUMENTS

| | | | |
|---|---|---|---|
| 1,919,244 A * | 7/1933 | Munz | B05B 3/0427 239/204 |
| 9,587,687 B2 | 3/2017 | Sesser | |
| 9,657,790 B2 | 5/2017 | Sesser | |
| 9,995,352 B2 | 6/2018 | Perkins | |
| 2015/0224520 A1* | 8/2015 | Kim | B05B 3/003 239/233 |
| 2016/0201744 A1* | 7/2016 | Sesser | B05B 3/005 188/296 |
| 2019/0015849 A1* | 1/2019 | Geerligs | B05B 3/003 |

* cited by examiner

*Primary Examiner* — Melanie Torres Williams
(74) *Attorney, Agent, or Firm* — Shaver & Swanson, LLP; Scott D. Swanson (57) ABSTRACT

What is disclosed is a self governing speed control device for controlling the rotation speed of a sprinkler turbine. The device has a housing that houses a viscous fluid. An axle extends into the housing and is configured to rotate in the housing. The axle is fixedly attached to a primary drum that rotates with the axle. One or more hinge pins extends from the primary drum. A brake shoe is positioned on the hinge pin. The hinge pin passes into a slot in an actuation drum configured to rotate on the axle. The brake shoe is configured to expand and contract based on the speed of rotation of the axle in relation to the speed of rotation of the actuation drum.

9 Claims, 8 Drawing Sheets

SPRINKLER BRAKING MECHANISM

CROSS-REFERENCE TO RELATED APPLICATIONS

This application claims the priority date of the provisional application entitled Sprinkler Braking Mechanism filed on Aug. 10, 2018, with application Ser. No. 62/717,321, the contents of which are incorporated by reference.

TECHNICAL FIELD

The herein disclosed and claimed inventive concepts generally relates to a speed control device for a sprinkler head, and more particularly to speed control device for slowing the speed of rotation of an axle attached to a sprinkler turbine.

SUMMARY OF DISCLOSURE

The purpose of the Summary of Disclosure is to enable the public, and especially the scientists, engineers, and practitioners in the art who are not familiar with patent or legal terms or phraseology, to determine quickly from a cursory inspection, the nature and essence of the technical disclosure of the application. The Summary of the Invention is neither intended to define the invention of the application, which is measured by the claims, nor is it intended to be limiting as to the scope of the invention in any way.

What is a sprinkler braking device. The sprinkler braking device has a housing containing a viscous fluid. An axle is disposed in the housing and rotatable relative to the housing. The sprinkler speed control device utilizes a braking mechanism configured to regulate the speed of rotation of the axle. In a preferred embodiment the speed control mechanism has a primary drum fixedly attached to the axle. At least one brake shoe, and preferably two opposing brake shoes, is rotateably attached to the primary drum. The brake shoe is configured to expand and contract radially in relation to the axle to control the speed of rotation of the axle. The brake shoe does not contact the housing. The resistance of the viscous liquid slows the rotation of the expanded brake shoe.

The speed control devices utilizes an actuation drum. Preferably the brake shoes are positioned between the actuation drum and the primary drum. The actuation drum is configured to rotate on the axle. The one or more brake shoes are configured to expand and contract in response to the speed of rotation of the actuation drum on said axle.

Preferably the braking mechanism utilizes one or more hinge pins that are connected to the primary drum. The brake shoe is rotateably positioned on the hinge pin. The hinge pin has a first end, a second end, and an intermediate section extending between the first end and the second end. The first end of the hinge pin is fixedly attached to the primary drum. The brake shoe is positioned on the intermediate portion of the hinge pin. Preferably the second end of the hinge pin extends into an actuation slot on the actuation drum. Rotation of the axle and primary drum causes the hinge pin to initiate rotation of the actuation drum. The relative rotational speed of the actuation drum to the axle causes the hinge pin(s) to travel in the hinge pin slots and cause faster or slower rotation of the actuation drum.

The brake shoe(s) preferably have a first end and a second end. The first end is positioned on the hinge pin and configured to rotate on the hinge pin. The brake shoe has an actuation slot extending generally from a first slot end proximal to the first end of the brake shoe to an actuation slot second end distal to the second end of the brake shoe. In a preferred embodiment the brake shoe(s) has a paddle like portion that is configured to generate drag when the brake shoe is radially expanded. In a preferred embodiment the actuation slot is configured such that movement of actuating pin toward the second end of the actuation slot causes the second end of the brake shoe to bias radially outward from said axle.

In a preferred embodiment the actuation drum is configured to rotate on the axle. The actuation drum comprises a hinge pin slot. The hinge pin extends through the brake shoe and into said hinge pin slot. The hinge pin is configured to travel from a first end of said hinge pin slot to a second end of said hinge pin slot in response to rotation of said primary drum.

Preferably the actuation drum has one or more fixedly attached actuating pins. The actuation pin extends into the actuation slot of the brake drum. The actuating pin and associated actuating pin slot are configured such that rotation of said actuation drum and actuating pin causes the radial expansion and contraction of the brake shoe.

In an embodiment the sprinkler braking device utilizes a torsion spring connected to the actuation drum and the axle and configured to bias the actuation drum toward a position in which the brake shoe is retracted.

In a preferred embodiment, the sprinkler braking device utilizes two or more brake shoes, each corresponding to an actuating pin on the actuator drum and each having an actuating slot.

Still other features and advantages of the claimed invention will become readily apparent to those skilled in this art from the preceding detailed description of preferred embodiments of the invention, simply by way of illustration of the best mode contemplated by carrying out my invention. As will be realized, the invention is capable of modification in various obvious respects all without departing from the invention. Accordingly, the description of the preferred embodiments is to be regarded as illustrative in nature, and not as restrictive in nature.

DETAILED DESCRIPTION OF THE EXEMPLARY EMBODIMENTS

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined in the claims.

Figure 1:
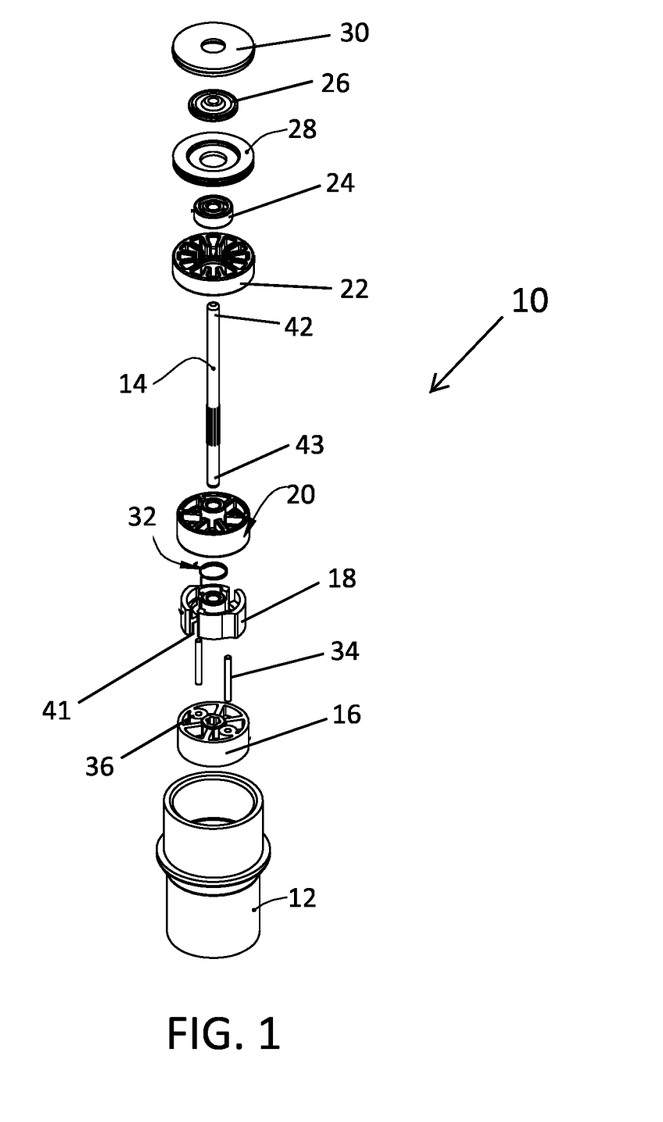
FIG. 1 is an exploded view of the Sprinkler Braking Mechanism.
Figure 2:
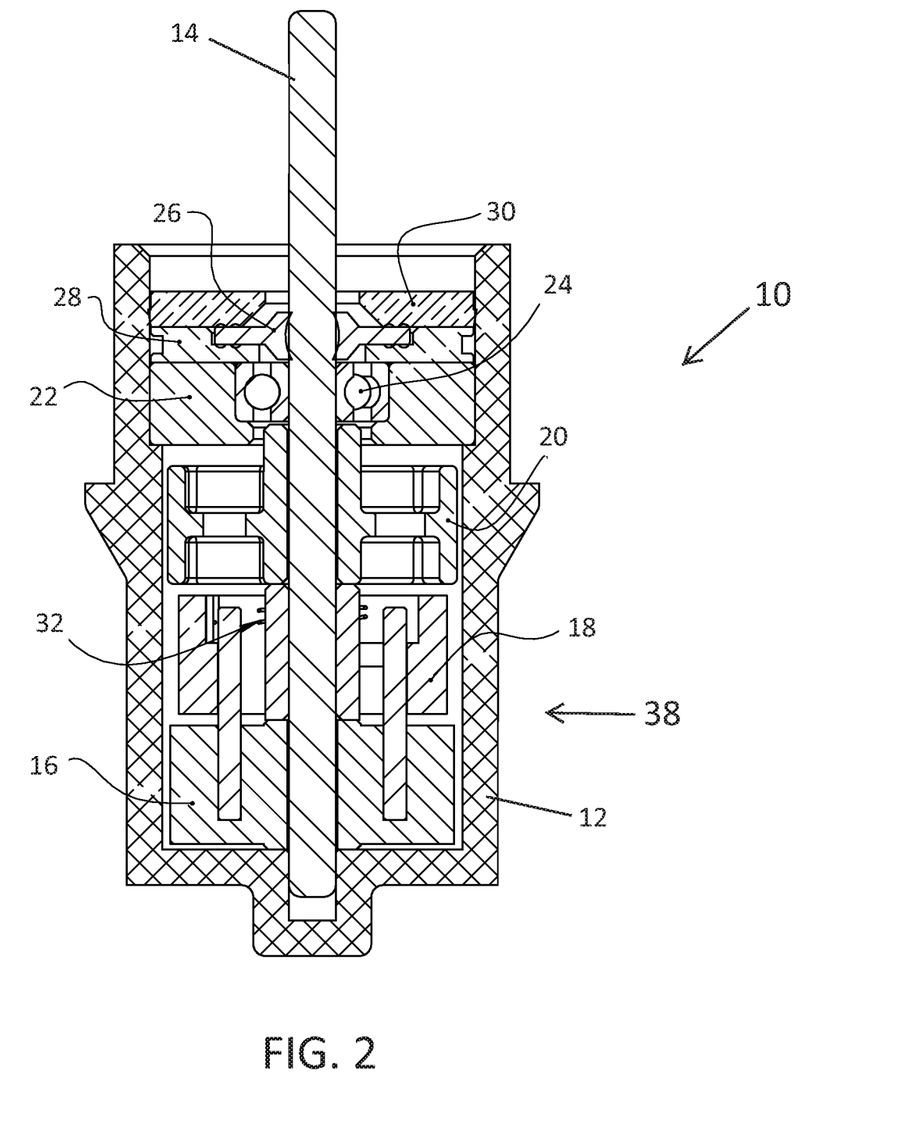
FIG. 2 is a section view of the Sprinkler Braking Mechanism.
Figure 3:
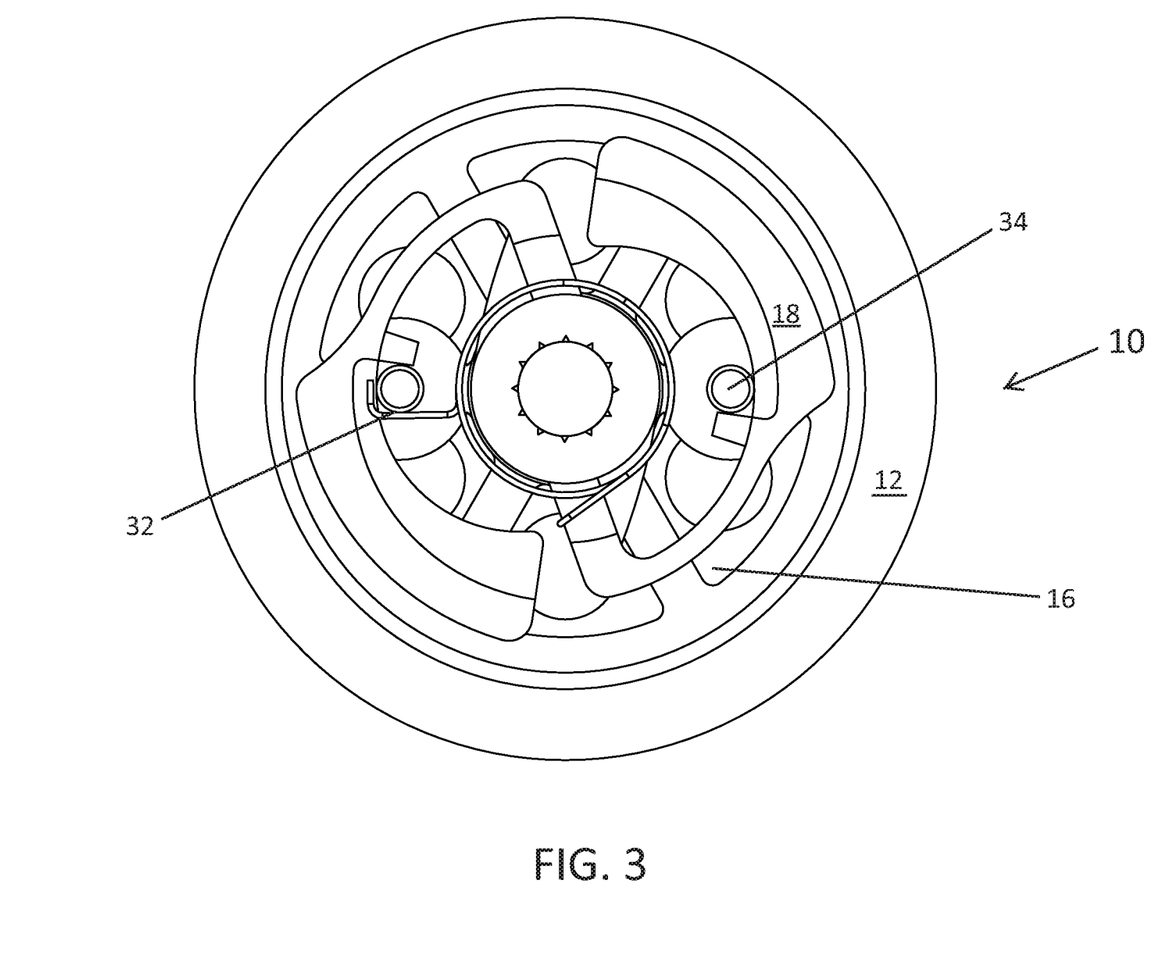
FIG. 3 is a view of the Sprinkler Braking Mechanism.

A first embodiment of the disclosed technology is shown in FIGS. 1 through 3. FIG. 1 is an exploded view of a preferred embodiment of the sprinkler braking mechanism 10. In the preferred embodiment, a housing 12 houses the sprinkler braking mechanism 10 and a viscous fluid.

The primary drum 20 and brake shoe assembly 18 are fixed on the axle 14. an actuator drum 16 in the preferred embodiment is not fixed on the axle 14. The actuating pins 34 are positioned in actuator bosses 36. A torsion spring 32 holds the actuator drum 16 in a rotary fashion in one direction in relation to the primary drum 20. When the actuator drum 16 is rotated in one direction, the spring 32 biases the actuator drum 16 back toward the original position in which the brake shoes are retracted 38. The housing utilizes a viscous fluid that as the inner parts spin faster, the brake shoes expand outward and experience drag from spinning through the fluid. When a fluid is sprayed on the turbine (not shown) connected to the axle, the axle 14 begins to rotate, causing the actuator drum 16 to spin. At a certain point, the actuator experiences enough drag to overcome the spring 32 and begins to rotate. At this point, the actuator drum 16, will lag behind the rotation of the primary drum 20 that is attached to the axle 14. During this initial rotation, the actuating pins 34 will shift up the ramps 41 of the regulating brake 18, which in turn, spread the regulating brake 18, causing increased resistance of the paddles against the viscous fluid. The increased friction by the regulating brake shoes expanding, thus creating a higher surface area encountering the viscous liquid. This causes the spinning of the axle 14 to slow. Once the axle is slowed down, the actuator drum 16 is allowed to catch up to the primary drum 20. When the actuator drum 16, slows down, it will allow the regulating brake 18 to retract again. During this process, the sprinkler braking mechanism 10 will find an optimal speed by self-governing speed preventing high speed rotation of the axle. High speed rotation of the axle will cause a viscus fluid to be rendered useless to dampen friction causing the sprinkler to improperly work.

The sprinkler braking mechanism 10 is connected to an external turbine of a sprinkler. The external turbine is driven by water pressure coming out of a nozzle. In the preferred embodiment, the bearing carrier 22 holds the bearing 24. The bearing carrier 22 holds the bearing 24 center on the shaft and holds the bearing 24 stationary. The lower seal retainer 28 and the upper seal retainer 30 hold the shaft seal 26. The shaft seal 26 retains the viscous fluid in the housing 12.

FIG. 2 is a section view of the sprinkler braking mechanism 10. In the preferred embodiment the axle 14 is centered in the housing 12. The axle 14 has a first axle end 43 and a second axle end 42. Inside the housing 12 is the actuator drum which contains the actuator pins 34. When the axle 14 is in rotation, the actuator pins 34 travel up the ramps 41 depending on how fast the axle 14 is rotating. As the axle 14 rotates faster, the actuating pins 34 travel further up the ramps 41 into the regulating brake 18 causing the brakes shoe 18 to expand. The more the regulating brake 18 expand, the more friction is generated with the expansion of the brake shoes, thus causing the rotation of the axle 14 to slow. The actuator drum 16 lags behind the primary drum 20 while the axle 14 is in rotation. This process allows the sprinkler braking mechanism 10 to self-govern speed by preventing overrotation while being utilized. In the preferred embodiment, the shaft seal 26 is held by the upper seal retainer 30 and the lower seal retainer 28 which prevents leakage of viscus fluid in the sprinkler braking mechanism 10. The bearing 24 is seated in the bearing carrier.

FIG. 3 is a view of the sprinkler braking mechanism having retracted brake shoes. The axle 14 is in the center of the housing 12. The actuator pins 34 will cause the regulating brake 18 to expand as they travel up the ramps 41. The spring 32 allow the actuator drum 16 to lag behind the primary drum 20 as speed of the axle 14 increases.

Figure 4:
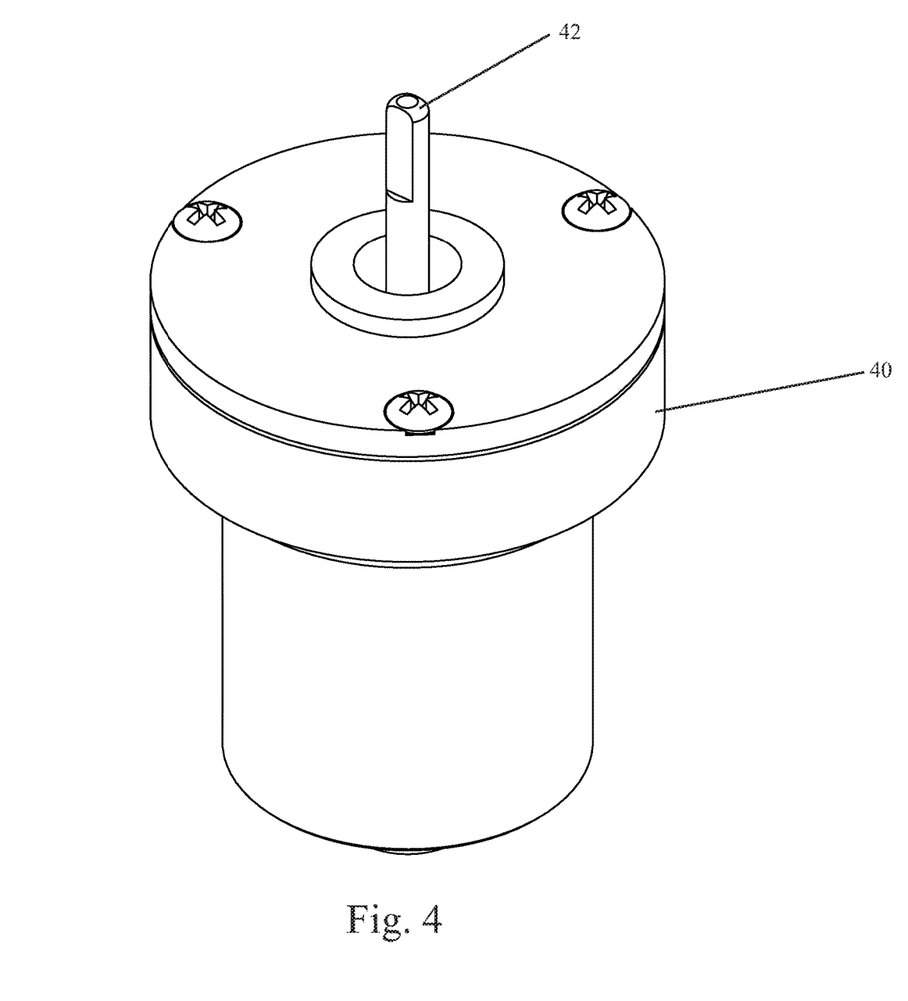
FIG. 4 is a perspective view of an embodiment of the inventive concepts.
Figure 5:
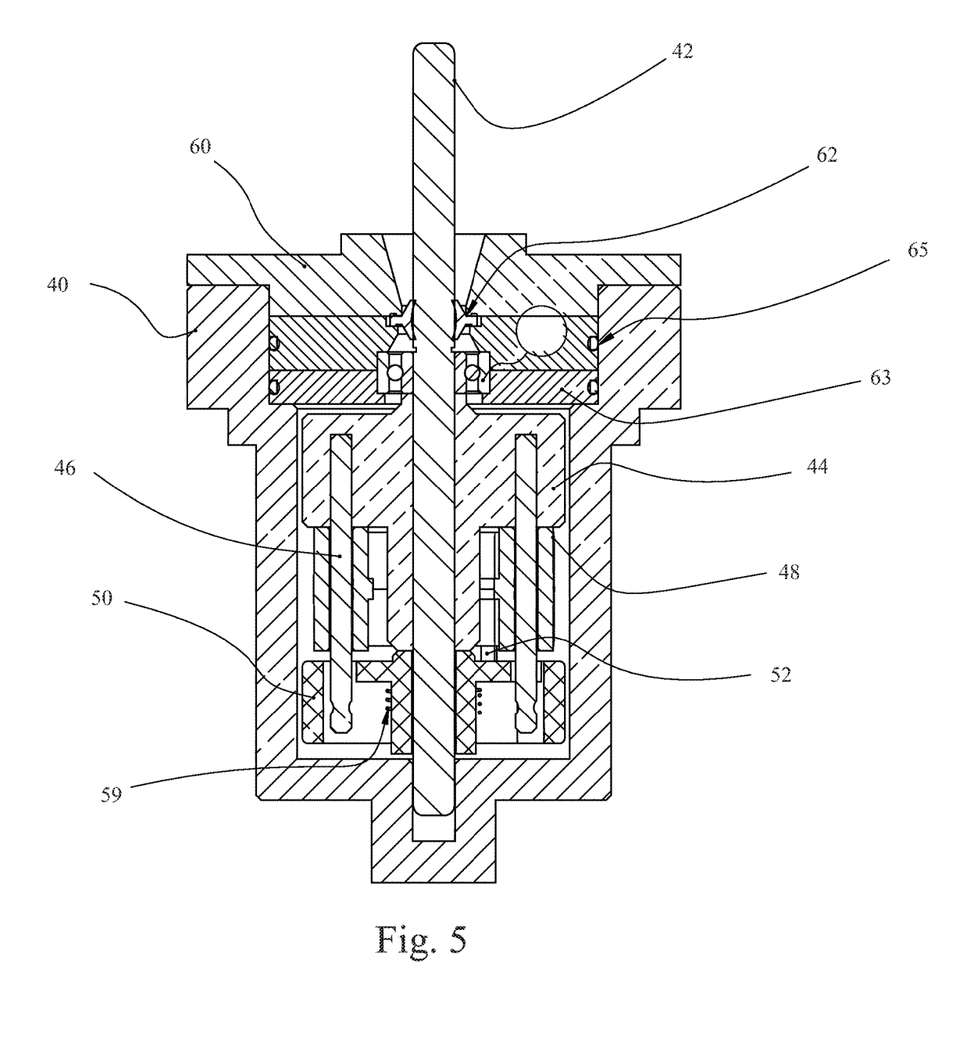
FIG. 5 is a cross section view of an embodiment of the inventive concepts.
Figure 6:
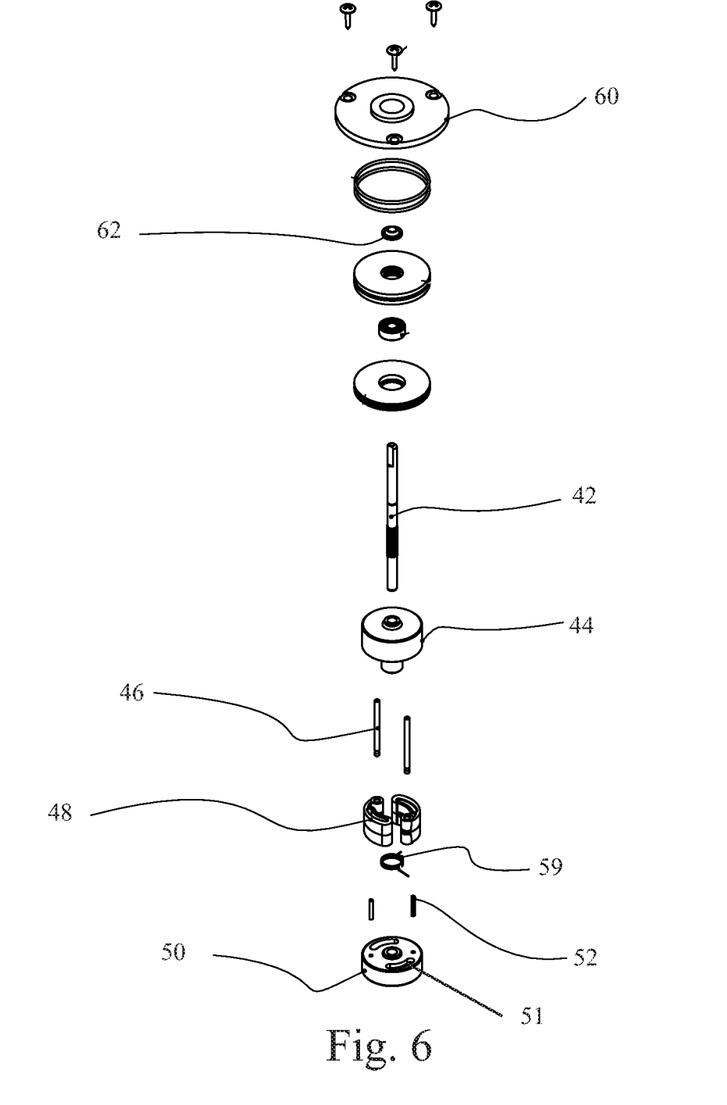
FIG. 6 is an exploded view of an embodiment of the inventive concepts.
Figure 7:
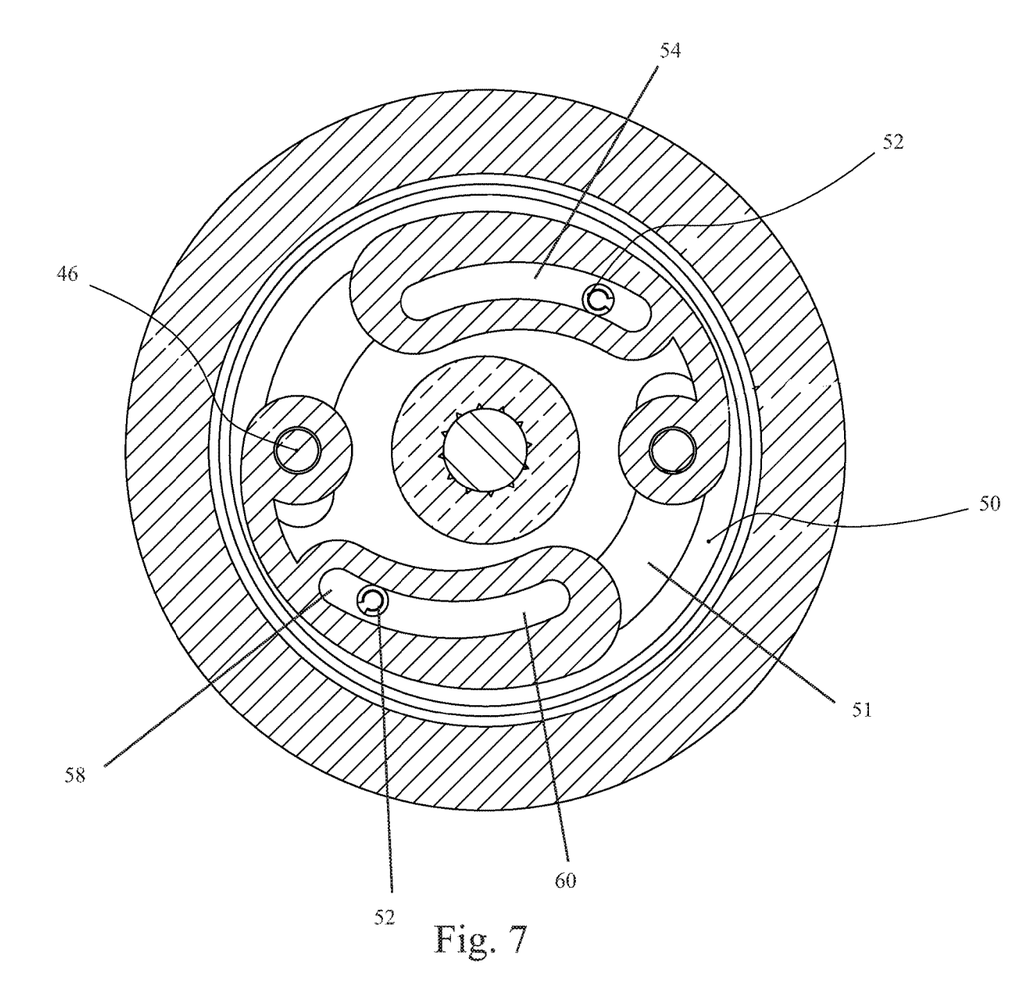
FIG. 7 is a cross section view of an embodiment of the inventive concepts.
Figure 8:
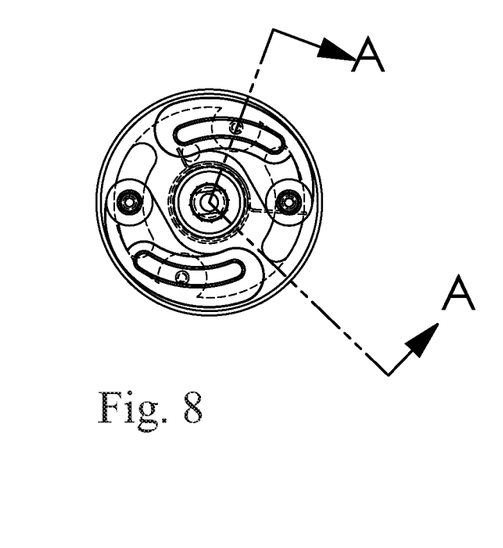
FIG. 8 is a cross section of an embodiment of the inventive concepts.
Figure 9:
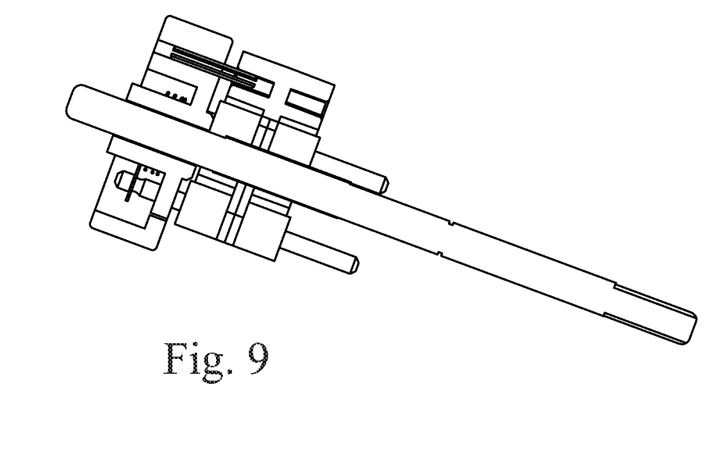
FIG. 9 is a cross section of an embodiment of the inventive concepts.

A second preferred embodiment is shown in FIGS. 4-7. FIG. 4 depicts an outer housing 40 of a sprinkler braking mechanism. The housing utilizes a cover 60 that retains the speed control device within the housing. The axle passes through the cover and through an upper bearing retaining member 63 and a lower bearing retaining member 64 that retain a shaft bearing 62. A shaft seal 62 is positioned to prevent external fluid from entering the speed control mechanism and to prevent viscous fluid housed within the speed control mechanism from escaping the housing.

An axle 42 extends into the housing wherein the braking mechanism is positioned. The axle is configured for attachment to a turbine of a sprinkler to control the rotational speed of the turbine. The axle is fixedly attached to a primary drum 44. The term fixedly is used herein to mean an attachment such that when two elements are fixedly attached, if one rotates the other rotates. The term fixedly includes both permanent attachment, such as by a pin being glued or integral with a second element, or removable, provided the pin and the second element rotate as one. The primary drum is configured to rotate within the housing when the axle rotates due to fluid impacting a sprinkler turbine. In the depicted embodiment two hinge pins 46 are fixedly attached to the primary drum. Each hinge pin extends through a brake shoe 48 and into an actuation drum 50. The hinge pins are configured such that the brake shoes rotate on the hinge pins as well as rotate about the axle with the hinge pins as the hinge pins rotate with the primary drum. The hinge pins extend through the brake shoes into hinge pin slots 51 within an actuation drum 50. The hinge pin slots 51 are configured such that as the primary drum rotates, the hinge pins travel from a first end of the hinge pin slots toward a second end of the hinge pin slots. When the hinge pins reach the second end of the hinge pin slots, the hinge pins engage the actuation drum causing it to rotate.

The actuation drum is not fixedly attached to the axle and instead its rotation is actuated by the hinge pins moving in the hinge pin slots. Two actuating pins 52 are depicted fixedly attached to the actuation drum. Each of the depicted actuating pins extends from the actuation drum into an actuation slot 54 in each brake shoe. The actuation slot in each brake shoe is configured such that when the brake shoe is positioned such that the actuating pin is at a second end of the actuation channel the paddle of the brake shoe is rotated outward. When the brake shoe is positioned such that the actuating pin is at a first end of the actuating chamber, the paddle of the brake shoe is at an inward position relative to the second position. In an embodiment a torsion spring is further provided to bias the actuation drum toward the first position at which the brake shoes are at their most inward position of axial displacement.

In a preferred embodiment the braking device is configured such that as fluid strikes the sprinkler turbine the sprinkler turbine rotates and causes rotation of the axle and primary drum. Rotation of the primary drum causes the hinge pins and brake shoes to rotate. The actuation drum lags behind the rotation until the hinge pins encounter the end of the hinge pin slots located in the actuation drum. The actuation drum then begins to rotate. Rotation of the actuation drum causes the actuating pins to move down the actuating slots in the brake shoes, causing the brake shoes to expand and slow the rotation of the axle. As the axle slows, the rotation of the actuation drum continues until it overcomes the speed of rotation of the axle. The actuation pins then travel down the actuating slots of the brake shoes causing the brake shoed to radially retract inward.

In rotation the hinge pins travel from a first end of each hinge pin's respective toward a second end of the hinge pin slot. When the hinge pins reach the second end of the slot, actuation drum begins to rotate with the hinge pins. Rotation of the actuation drum causes the actuating pins of the actuation drum to rotate and change position within the actuation slots of the brake shoes. The change in positioning of the actuating pins relative to the actuation slots causes the brake shoes to radially expand and contract. Radial expansion of the brake shoes in the viscous fluid increases drag (and thus braking) on the system, whereas the actuating slots and hinge pin slots thus governing the amount of drag on the brake shoes.

Following initial fluid spray on the turbine, the braking system equalizes with the force generated by the fluid spray on the sprinkler turbine and achieves sprinkler regulation. This rotation causes the brake shoe to move relative to the actuating pins positioned within the actuation slots of the brake shoes. As the hinge pins travel in the slots toward the second end, the brake shoes travel relative to the actuating pins in the actuating slots in the brake shoes to cause the brake shoes to slide about the actuating pins and to rotate outward. The outward rotation of the brake shoes increases drag of the brake shoes in the viscous fluid and causes the slowing of rotation of the axle, primary drum, and brake shoes. The actuation drum rotates freely and if rotating faster than the brake shoes, the actuating pins move down the actuation slot causing the brakes shoes to radially contract. The contraction and expansion of the brake shoes is limited by the ends of the actuation slots as well as the ends of the hinge pin slots that limit the speed of rotation of the actuation drum.

While certain preferred embodiments are shown in the figures and described in this disclosure, it is to be distinctly understood that the presently disclosed inventive concept(s) is not limited thereto but may be variously embodied to practice within the scope of the following claims. From the foregoing description, it will be apparent that various changes may be made without departing from the spirit and scope of the disclosure as defined by the following claims.

We claim:

1. A sprinkler braking device, said device comprising:
a housing containing a viscous fluid
an axle disposed in the housing and rotatable relative to the housing;
a braking mechanism configured to regulate the speed of rotation of said axle, said braking mechanism comprising:
a primary drum fixedly attached to said axle and configured to rotate with said axle;
an actuation drum, wherein said actuation drum is configured to rotate on said axle;
a brake shoe operationally connected to said actuation drum and said axle such that said brake shoe is configured to expand and contract radially due to a relative rotational speed of the actuation drum to the axle; and
wherein an actuating pin extends from said actuation drum to a ramp of said brake shoe, wherein a relative rotational speed of the actuation drum to the axle causes said actuating pin to shift up and down said ramp as the relative rotational speed of the actuation drum to the axle increases and decreases thus causing said brake shoe to radially expand and contract relative to said axle.

2. The sprinkler braking device of claim 1, wherein said brake shoe is configured to be biased to a retracted position by a torsion spring.

3. A sprinkler braking device, said device comprising:
a housing containing a viscous fluid
an axle disposed in the housing and rotatable relative to the housing;
a braking mechanism configured to regulate the speed of rotation of said axle, said speed control mechanism comprising:
a primary drum fixedly attached to said axle;
a hinge pin comprising a first end, a second end, and an intermediate section extending between said first end and said second end wherein said first end of said hinge pin is fixedly attached to said primary drum;
a brake shoe comprising a first end and a second end, wherein said first end is positioned on said hinge pin and configured to rotate on said hinge pin, wherein said brake shoe comprises an actuation slot extending generally from a first slot end proximal to said first end of said brake shoe to an actuation slot second end distal to said second end of said brake shoe;
an actuation drum, wherein said actuation drum is configured to rotate on said axle, wherein said actuation drum comprises a hinge pin slot, wherein said hinge pin extends through said brake shoe and into said hinge pin slot, wherein said hinge pin is configured to travel from a first end of said hinge pin slot to a second end of said hinge pin slot in response to rotation of said primary drum; and
an actuating pin, wherein said actuating pin is attached to said actuation drum, wherein said actuating pin extends into said actuation slot of said brake shoe, wherein said actuating pin and said actuating pin slot are configured such that rotation of said actuation drum and actuating pin causes the radial expansion and contraction of said brake shoe.

4. The sprinkler braking device of claim 3 further comprising a torsion spring connected to said actuation drum and configured to bias said actuation drum toward said first position.

5. The sprinkler braking device of claim 3 wherein said brake shoe comprises a first brake shoe, wherein said hinge pin comprises a first hinge pin, wherein said braking mechanism comprises a second hinge pin comprising a first end, a second end, and an intermediate section extending between said first end and said second end, wherein said first end of said second hinge pin is fixedly attached to said primary drum; and
a second brake shoe comprising a first end and a second end, wherein said first end of said second brake shoe is positioned on said hinge pin and configured to rotate on said second hinge pin, wherein said brake shoe comprises an actuation slot extending generally from a first slot end proximal to said first end of said brake shoe to an actuation slot second end distal to said second end of said brake shoe.

6. The sprinkler braking device of claim 3 wherein said axle is connected to a sprinkler turbine.

7. The sprinkler braking device of claim 3 wherein said brake shoe comprises a brake shoe first end and a brake shoe second end, wherein said first end is configured to rotate on said hinge pin, wherein said second end comprises a generally paddle shape, wherein said actuation slot extends from a position proximal to said first end of said paddle toward said second end of said paddle.

8. The sprinkler braking device of claim 3, wherein said actuation slot is configured such that movement of said actuating pin toward said second end of said actuation slot causes said second end of said brake shoe to bias radially outward from said axle.

9. The sprinkler braking device of claim 3 wherein said device comprises a plurality of actuating pins attached to said actuation drum and a plurality of brake shoes comprising actuating slots.

\* \* \* \* \*